United States Patent
Yang

(10) Patent No.: US 6,540,238 B2
(45) Date of Patent: Apr. 1, 2003

(54) COUPLING DEVICE FOR CONNECTING A SKATE BOARD WITH A BABY CARRIAGE

(76) Inventor: Peng-Yao Yang, No. 561, Section 4, An Ho Road, Tainan (TW)

( * ) Notice: Subject to any disclaimer, the term of this patent is extended or adjusted under 35 U.S.C. 154(b) by 68 days.

(21) Appl. No.: 09/930,460

(22) Filed: Aug. 16, 2001

(65) Prior Publication Data

US 2003/0034632 A1 Feb. 20, 2003

(51) Int. Cl.[7] .............................................. B62D 63/00
(52) U.S. Cl. ..................................... 280/32.7; 280/503
(58) Field of Search ............................. 280/63, 66, 69, 280/504, 503, 47.27, 32.7

(56) References Cited

U.S. PATENT DOCUMENTS

| | | | | | |
|---|---|---|---|---|---|
| 1,435,064 | A | * | 11/1922 | Holmes | 280/493 |
| 2,980,442 | A | * | 4/1961 | Krokos | 280/502 |
| 3,834,726 | A | * | 9/1974 | Hobza | 280/32.7 |
| 5,806,878 | A | * | 9/1998 | Mroczka | 280/63 |
| 6,099,008 | A | * | 8/2000 | Caffey | 280/503 |
| 6,422,634 | B2 | * | 7/2002 | Lundh | 280/32.7 |
| 6,443,252 | B1 | * | 9/2002 | Andes | 280/32.7 |

* cited by examiner

Primary Examiner—Daniel G. DePumpo
(74) Attorney, Agent, or Firm—Rosenberg, Klein & Lee

(57) ABSTRACT

A coupling device is provided with one end secured to the front end of a skate board and the other end secured to the rear axle of a baby carriage. The coupling device includes a coupler, a belt, a buckle article and a mounting block. The coupler is divided into two halves. Both ends of each half are provided with screwing holes. Two halves of the coupler are screwed to the rear axle of a baby carriage, the mounting block is screwed to the front end of a skate board, and one end of the belt is connected with the buckle article. After being penetrated through the buckle ring of the mounting block and encircling the center of the coupler, the other end of the belt is penetrated through the buckle article and fastened by the pressing piece of the buckle article.

2 Claims, 2 Drawing Sheets

COUPLING DEVICE FOR CONNECTING A SKATE BOARD WITH A BABY CARRIAGE

BACKGROUND OF THE INVENTION

1. Field of the Invention

The present invention relates to a coupling device for connecting a skate board with a baby carriage, and more particularly to a coupling device whose one end is secured to the front end of a skate board and whose other end is pivotally secured to the rear axle of a baby carriage so as for a user to slide the skate board instead of walking while pushing the baby carriage.

2. Description of the Related Art

A baby carriage is one of the indispensable vehicles for a family having a baby while going out for a walk. Although a conventional baby carriage is convenient for a person to carry a baby to go for a short distance of walk, the person pushing the baby carriage will feel bored and tired from walking and pushing the baby carriage for a long distance. Therefore, the fun and mood to enjoy leisure time with a baby will be destroyed. It is an imperfection.

SUMMARY OF THE INVENTION

Accordingly, the present invention is directed to a coupling device for connecting a skate board with a baby carriage that can substantially obviate the drawback and promote the practical use of a conventional related art.

An object of the present invention is to provide a coupling device for connecting a skate board with a baby carriage so as for the baby carriage to be pushed quickly and easily by a person.

Another object of the present invention is to provide a coupling device for connecting a skate board with a baby carriage so as for a person who is pushing a baby carriage to be able to do leisure-time activity at the same time.

Yet another object of the present invention is to provide a coupling device whose one end is secured to the front end of a skate board and whose other end is pivotally secured to the rear axle of a baby carriage so as to firmly connect the skate board with the baby carriage and convenient for a person to push the baby carriage forwardly by hand and to slide the skate board by feet at the same time.

To achieve these and other advantages, the present invention provides a coupling device for connecting a skate board with a baby carriage. One end of the coupling device is secured to the front end of a skate board, and the other end is pivotally secured to the rear axle of a baby carriage. The coupling device includes a coupler, a belt, a buckle article and a mounting block. The coupler, being the shape of a dumbbell, is divided into two halves. Inside of each half can be provided with a movable pad if needed, and both ends of each half are provided with screwing holes. Two halves of the coupler with two pads are secured and screwed to the rear axle of a baby carriage, the mounting block is screwed to the front end of a skate board, and one end of the belt is firmly connected with the buckle article. After being penetrated through the buckle ring of the mounting block and encircling the center of the coupler, the other end of the belt is penetrated through the buckle article and then fastened by the pressing piece of the buckle article so as to finish assembly.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 3:
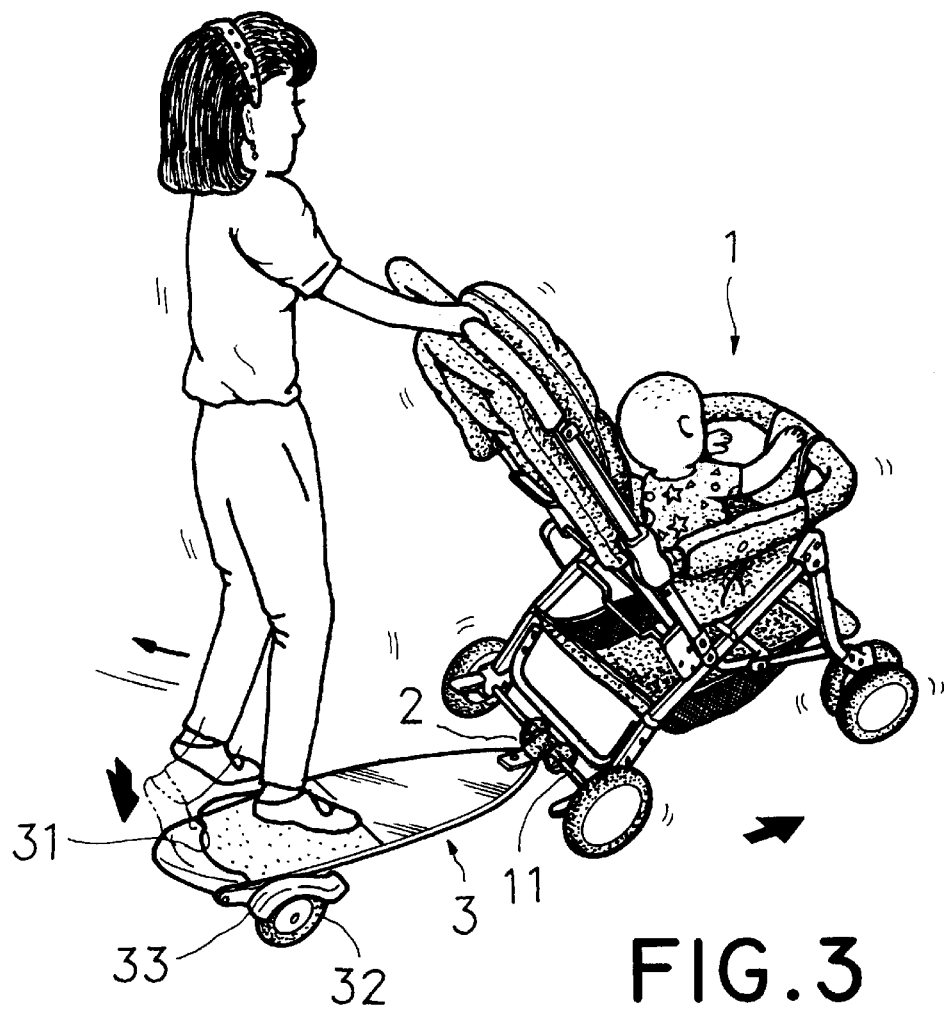

Referring to FIG. 3, a preferred embodiment of a coupling device 2 in the present invention is provided to connect a skate board 3 with a baby carriage 1. One end of the coupling device 2 is secured to the front end of the skate board 3, and the other end of the coupling device 2 is pivotally secured to the rear axle 11 of the baby carriage 1.

Figure 1:
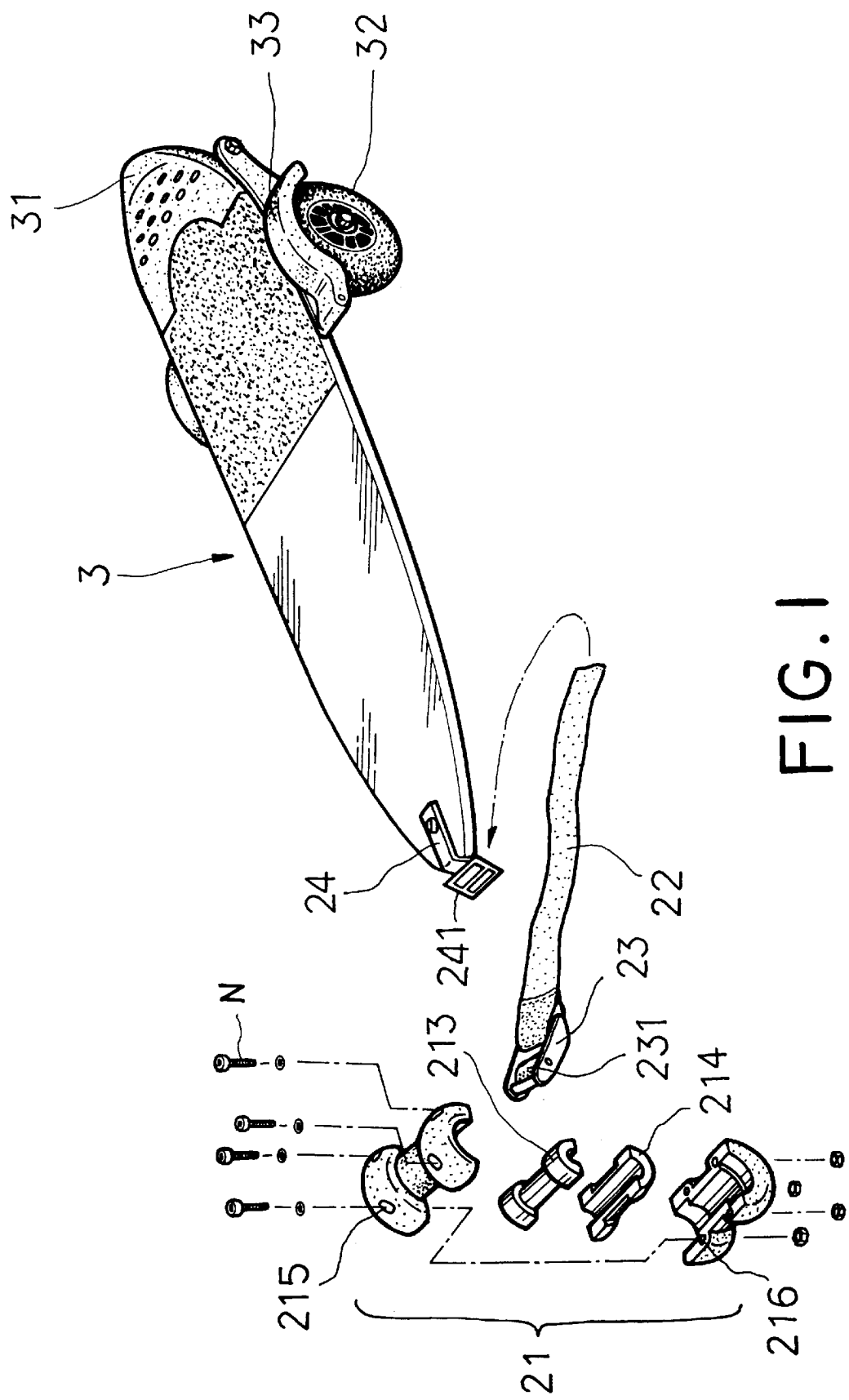
FIG. 1 is a perspective exploded view of an embodiment of the coupling device and a skate board in accordance with the present invention.

Referring to FIG. 1, the coupling device 2 includes a coupler 21, a belt 22, a buckle article 23 and a mounting block 24. The coupler 21, being the shape of a dumbbell, is divided into two halves 211, 212. Inside of each half 211 or 212 can be provided with a movable pad 213 or 214 if needed, and both ends of each half 211 or 212 are provided with screwing holes 215 or 216. One end of the belt 22 is connected with the buckle article 23. The buckle article 23 is provided with a pressing piece 231 in the interior. The mounting block 24 is provided to be screwed to the front end of the skate board 3, and a buckle ring 241 is provided on the front end of the mounting block 24 to be penetrated through by the other end of the belt 22.

The front half of the skate board 3 is narrower than the rear half, and a brake 31 is provided on the tail of the skate board 3. The brake 31 is connected with the brake covers 33 above the wheels 32.

Figure 2:
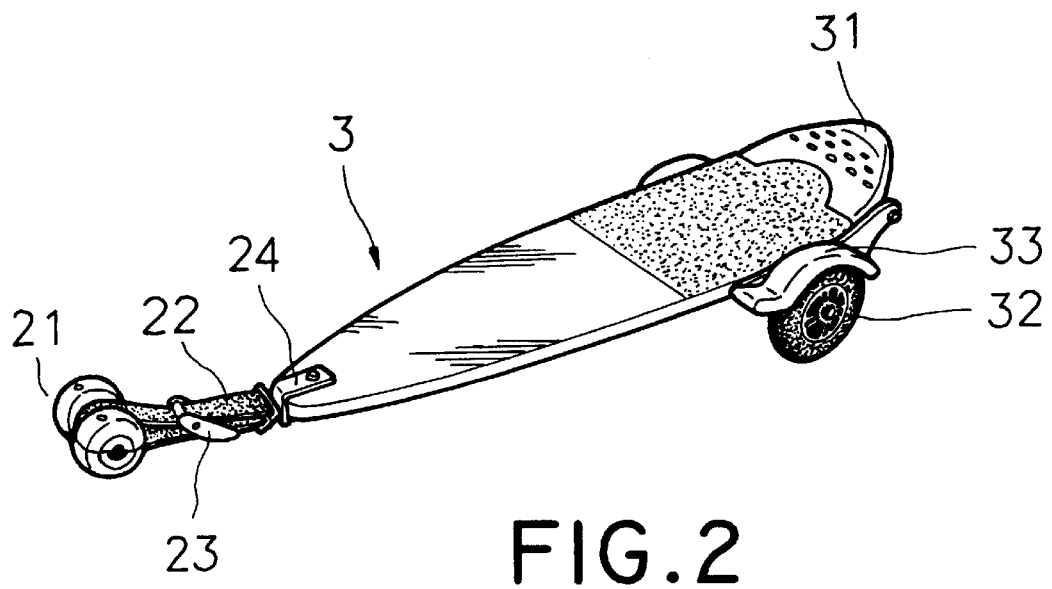
FIG. 2 is a perspective view of an embodiment of the coupling device being combined with a skate board in accordance with the present invention; and, FIG. 3 is a schematic view showing the skate board with the coupling device in accordance with the present invention being secured to the rear axle of a baby carriage while a user sliding the skate board and pushing the baby carriage at the same time.

While being assembled, referring to FIG. 2, two halves 211, 212 of the coupler 21 with two pads 213, 214 are pivotally secured to the rear axle 11 of the baby carriage 1 by screwing screws N into the screwing holes 215, 216, the mounting block 24 is screwed to the front end of the skate board 3, and one end of the belt 22 is firmly connected with the buckle article 23. After being penetrated through the buckle ring 241 of the mounting block 24 and encircling the center of the coupler 21, the other end of the belt 22 is penetrated through the buckle article 23 and then fastened by the pressing piece 231 of the buckle article 23 so as to finish assembly, as shown in FIG. 3.

While being used, referring to FIG. 3, after holding the handle of the baby carriage 1, a user stands on the rear half of the skate board 3 with one foot so as for the front half of the skate board 3 to be raised upward to be horizontal and then slides the skate board 3 forward with the other foot so as to force the baby carriage 1 to go forward accordingly. If the baby carriage 1 with the skate board 3 runs too fast, the user on the skate board 3 can slow down or stop the skate board 3 by stepping on the brake 31 with one foot.

While the preferred embodiments of the invention have been described above, it will be recognized and understood that various modifications may be made thereto and the appended claims are intended to cover all such modifications which may fall within the spirit and scope of the invention.

What is claimed is:

1. A coupling device for connecting a skate board with a baby carriage comprising:

a coupler being the shape of a dumbbell and divided into two halves, both ends of each said half being provided with screwing holes;

a belt being provided with one end connected with a buckle article, said buckle article being provided with a pressing piece in the interior; and, a mounting block being provided to be screwed to the front end of a skate board, a buckle ring being provided on the front end of said mounting block to be penetrated through by the other end of said belt, the front half of said skate board being narrower than the rear half, a brake being provided on the tail of said skate board, said brake being connected with brake covers above the wheels of said skate board;

wherein while said coupling device being assembled, said two halves of said coupler being pivotally secured to the rear axle of a baby carriage, said mounting block being screwed to the front end of said skate board, after being penetrated through said buckle ring of said mounting block and encircling the center of said coupler, the other end of said belt being penetrated through said buckle article firmly connected with one end of said belt and then fastened by said pressing piece of said buckle article so as to finish assembly.

2. A coupling device for connecting a skate board with a baby carriage as claimed in claim 1, wherein a movable pad can be provided inside each half of said coupler if needed.

* * * * *